(12) United States Patent
Fukuda et al.

(10) Patent No.: US 9,796,015 B2
(45) Date of Patent: Oct. 24, 2017

(54) MOLDING SAND FOR THREE DIMENSIONAL LAMINATE MOLDING

(75) Inventors: Yoya Fukuda, Numazu (JP); Kenichi Hayashi, Shizuoka (JP); Takashi Komai, Shizuoka (JP); Yusuke Urushibata, Shizuoka (JP); Yusuke Tomita, Shizuoka (JP)

(73) Assignee: Kimura Chuzosho Co., Ltd., Shizuoka (JP)

( * ) Notice: Subject to any disclaimer, the term of this patent is extended or adjusted under 35 U.S.C. 154(b) by 74 days.

(21) Appl. No.: 14/343,893

(22) PCT Filed: Sep. 10, 2012

(86) PCT No.: PCT/JP2012/073760
§ 371 (c)(1),
(2), (4) Date: Mar. 10, 2014

(87) PCT Pub. No.: WO2013/171921
PCT Pub. Date: Nov. 21, 2013

(65) Prior Publication Data
US 2014/0224152 A1 Aug. 14, 2014

(30) Foreign Application Priority Data
May 17, 2012 (JP) .................................. 2012-113632

(51) Int. Cl.
*B28B 7/36* (2006.01)
*C04B 35/66* (2006.01)
(Continued)

(52) U.S. Cl.
CPC .................. *B22C 1/10* (2013.01); *B22C 1/02* (2013.01); *B22C 1/22* (2013.01); *B22C 9/02* (2013.01); *B33Y 70/00* (2014.12)

(58) Field of Classification Search
None
See application file for complete search history.

(56) References Cited

U.S. PATENT DOCUMENTS 2,817,128 A * 12/1957 Wickett .................. B22C 1/167
106/38.3
2,828,214 A * 3/1958 Myers ....................... B22C 1/02
106/38.4
(Continued)

FOREIGN PATENT DOCUMENTS

EP 0431924 A2 6/1991
JP H05-169184 A 7/1993
(Continued)

OTHER PUBLICATIONS

"Crystal Quartz (SiO2) and Fused Silica". http://www.mt-berlin.com/frames_cryst/descriptions/quartz%20.htm# (Mar. 25, 2010 via Internet Wayback Machine).*
(Continued)

*Primary Examiner* — Kaj K Olsen
*Assistant Examiner* — Ross J Christie
(74) *Attorney, Agent, or Firm* — Osha Liang LLP

(57) ABSTRACT

According to the invention, by setting the linear thermal expansion amount when a mold made of a molding sand is heated from a room temperature to 1000° C. to be not more than 0.9%, and the ratio (D/d) between the diameter of a slump (D) and the diameter of a slump cone (d) in a slump test of the molding sand having a hardening agent kneaded to be not less than 1.65, a molding sand preferable for use in a mold produced using the self-hardening type of three dimensional laminate molding sand mold, having low thermal expansibility preventing occurrence of a veining defect, and capable of forming a large and complicated shape can be obtained.

5 Claims, 3 Drawing Sheets

(51) Int. Cl.
*B22C 1/10* (2006.01)
*B22C 9/02* (2006.01)
*B33Y 70/00* (2015.01)
*B22C 1/02* (2006.01)
*B22C 1/22* (2006.01)

(56) References Cited

U.S. PATENT DOCUMENTS

| | | | | |
|---|---|---|---|---|
| 3,601,161 | A | * | 8/1971 | Buhrer ................ B22C 5/12 141/107 |
| 3,683,995 | A | * | 8/1972 | Zifferer ............... B22C 9/123 106/38.3 |
| 3,857,712 | A | * | 12/1974 | Chevriot ............. B22C 1/188 106/38.3 |
| 4,462,777 | A | | 7/1984 | Watanabe et al. |
| 6,591,891 | B2 | * | 7/2003 | Kanayama ........... B22C 1/181 164/5 |
| 2002/0110044 | A1 | * | 8/2002 | Kanayama ........... B22C 1/181 366/8 |
| 2009/0093567 | A1 | * | 4/2009 | Oniyanagi ........... B22C 1/2253 523/148 |
| 2010/0139586 | A1 | * | 6/2010 | Nakamura ............ B22C 9/10 123/90.6 |
| 2011/0042028 | A1 | * | 2/2011 | Velasco-Tellez ...... B22C 1/185 164/21 |
| 2012/0043694 | A1 | * | 2/2012 | Kagitani ............. B22C 1/2253 264/219 |

FOREIGN PATENT DOCUMENTS

| | | | |
|---|---|---|---|
| JP | H06-218712 | A | 8/1994 |
| JP | H09-168840 | A | 6/1997 |
| JP | 2003-251434 | A | 9/2003 |
| JP | 2004-202577 | A | 7/2004 |
| JP | 2004202577 | A * | 7/2004 |
| JP | 2006-007319 | A | 1/2006 |
| JP | 2009-119469 | A | 6/2009 |
| JP | 2009119469 | A * | 6/2009 |
| KR | 930012259 | B1 * | 12/1993 |
| WO | 2011/075222 | A1 | 6/2011 |

OTHER PUBLICATIONS

International Search Report for corresponding International Application No. PCT/JP2012/073760, dated Dec. 11, 2012 (4 pages).
Notification for Reason for Refusal for corresponding Japanese Application No. 2012-113632, dated Dec. 4, 2012 (4 pages).
Second Office Action issued in corresponding Chinese Application No. 201280068184.4, dated Jan. 22, 2016 (6 pages).
Third Office Action dated Jun. 17, 2016, in corresponding Chinese Application No. 201280068184.4 (with translation) (6 pages).
Extended European Search Report issued in EP Application No. 12876702.7, dated Jun. 5, 2015 (5 pages).

* cited by examiner

Example of Typical Veining Defect[1]
1) Casting Defects and Countermeasures Thereof,
28 March 2007, Japan Foundry Engineering Society

MOLDING SAND FOR THREE DIMENSIONAL LAMINATE MOLDING

BACKGROUND OF THE INVENTION

Field of the Invention

This invention relates to a molding sand for three dimensional laminate molding (e.g., 3D printing, additive manufacturing) for use in an organic self-hardening mold for molding, and particularly to a molding sand for a sand mold with no veining defect occurring upon molding.

Related Art

Currently, molded products with various shapes, sizes and materials are used in various fields.

Also, in recent years, as products difficult to cast, products requiring a complicated mold, i.e. sand mold have been increasing. Therefore, a sand mold (mold) by an organic binder with characteristics that after molding, a molding sand is easily removed to easily produce, also the strength is high, deformation is less, and the like has actively been used.

On the other hand, as a raw material of a cylinder head for a large diesel engine which is required to have higher strength as compared to small one for an automobile, cast iron, which has a high melting point and is difficult to be molded, is adopted.

Here, as a method for producing a sand mold into which the above cast iron is cast, there is a three dimensional laminate molding method, i.e. RP (rapid prototyping) molding method, and this method is a technique for producing a sand mold directly from 3DCAD data (e.g. Patent Document 1). This RP molding method has advantages in that a sand mold with a complicated shape can easily be produced and the dimension accuracy is good.

Moreover, the RP molding method using a mold by an organic binder is classified into a two liquid mixed self-hardening type of printing a resin to a sand having a hardening agent as a catalyst for hardening a resin mixed, and a thermohardening type of illuminating laser to a sand having been coated with resin in advance (RCS: resin coated sand) to harden.

Here, the thermohardening type of three dimensional laminate molding is, since the resin used is excellent in heat resistance, possible to be applied to many materials from aluminum alloy to be cast into at a low temperature to cast iron and cast steel to be cast into at a high temperature. Therefore, for high melting point metal such as cast iron, the thermohardening type has conventionally been used.

PRIOR ART DOCUMENTS

Patent Documents

Patent Document 1: JP-A-H9-168840
Patent Document 2: JP-A-H5-169184
Patent Document 3: JP-A-2003-251434
Patent Document 4: JP-A-2004-202577

SUMMARY OF THE INVENTION

Problem to be Solved by the Invention

However, in the thermohardening type of three dimensional laminate molding technique, since it is difficult to increase in size of the equipment to use therefor, a large molded product cannot be obtained and even if a large product is attempted to be molded, its molding requires a large amount of time. Therefore, there is a problem in that it cannot be applied to a large product. Moreover, since sufficient strength cannot be obtained by laser illumination only, there is also trouble that heat treatment needs to be performed after molding to increase the strength.

In contrast, three dimensional laminate molding by the two liquid mixed self-hardening type, which is, by using a large printer head, capable of molding a large product quickly, can be applied to a large product, and is also an advantageous molding method in terms of production cost and productivity. Moreover, since sufficient strength can be obtained by printing of a resin only, there is also an advantage in that heat treatment does not need to be performed after molding.

Thus, the inventors have attempted to mold a cylinder head of cast iron by a three dimensional laminate molding sand mold produced by the RP molding method by the two liquid mixed self-hardening type of printing a resin to a sand having a hardening agent as a catalyst for hardening a resin mixed.

However, it has newly been found that when a natural silica sand is used according to the conventional method, a burr-like defect which is referred to as a veining defect as shown in FIG. 1 easily occurs. In particular, if the above burr-like defect occurs in the inside such as a groove formed complicatedly, a problem is huge as it cannot be removed even by an additional processing.

The inventors have kept examining further to solve the above new problems.

As a result, in the current three dimensional laminate molding, although a sand mold for molding is mainly produced by a silica sand, it has been found that since the silica sand has structural phase transition occurred at around 570° C. resulting in expansion of volume, a fine crack occurs in a mold, and molten metal is intruded into the crack.

In consideration with the above findings, the inventors have, in recent years, focused on low thermal expansibility of an artificial sand with the purpose of improving flowability and fire resistance of a sand, for example an artificial sand produced by a sintering method, a fusion method (atomizing method), a flame fusion method and the like as descried in Patent Documents 2 to 4, and attempted to apply it to the three dimensional laminate molding method (see FIG. 2).

However, it has been found that only by simply kneading an artificial sand and a hardening agent, the flowability of a molding sand becomes extremely poor, and in a recoater for laminating a sand with the purpose of forming a complicated shape, as shown in FIG. 3, a molding sand does not flow.

In addition, it has also been confirmed that the above thermohardening type, which coats a resin to a molding sand in advance, does not have the problem of flowability. Moreover, for the above self-hardening type of sand mold, it is common to use a natural sand having a hardening agent added and kneaded.

The invention is to advantageously solve the above problems, and the object is to provide a molding sand preferable for use in a mold produced using the self-hardening type of three dimensional laminate molding sand mold, having low thermal expansibility preventing occurrence of a veining defect, and capable of forming a large and complicated shape.

Means for Solving the Problem

The inventors have, in order to solve the above problems, kept examining further diligently about thermal expansibility and flowability of an artificial sand and the like. Then they have found that a molding sand having thermal expansibility for no veining defect to occur, and capable of laminating a sand with the purpose of forming a large and complicated shape may be obtained by mixing so as to have predetermined thermal expansion property and flowability.

The invention has been completed based on the above findings.

Thus, the summary of the invention is as follows.

1. A molding sand for three dimensional laminate molding, having a hardening agent as a catalyst for hardening a resin kneaded, wherein the linear thermal expansion amount when a mold produced using the molding sand is heated from a room temperature to 1000° C. is not more than 0.9%, and the ratio (D/d) between the diameter of a slump (D) and the diameter of a slump cone (d) in a slump test of the molding sand is not less than 1.65.

2. A molding sand for three dimensional laminate molding according to the above item 1, wherein the molding sand is a molding sand having a second component and the hardening agent kneaded to a natural silica sand, and the second component is a natural or artificial sand with a linear thermal expansion amount smaller than the natural silica sand.

3. A molding sand for three dimensional laminate molding according to the above item 2, wherein the second component is an artificial sand produced by any of a sintering method, a fusion method or a flame fusion method, and is at least one kind selected from a new sand, a reclaimed sand thereof and a reworked (or recycled) sand thereof.

4. A molding sand for three dimensional laminate molding according to any of the above item 2 or 3, wherein the kneading ratio of the second component is, based on the mass of the molding sand, 40 to 95% by mass.

5. A molding sand for three dimensional laminate molding according to any of the above items 1 to 4, wherein the kneading ratio of the hardening agent is, based on the mass of the molding sand, 0.1 to 1.0% by mass.

6. A molding sand for three dimensional laminate molding according to any of the above items 3 to 5, wherein the average particle size of the artificial sand is 0.5 to 2 times the average particle diameter of the natural silica sand.

Effect of the Invention

According to the invention, it is possible to provide a molding sand for three dimensional laminate molding capable of producing a molded product with a large and complicated shape while preventing occurrence of a veining defect.

BRIEF DESCRIPTION OF DRAWINGS

The invention will be described with reference to the accompanying drawings, wherein:

FIG. 2 is a graph showing the thermal expansion amount of an artificial sand and the like;

MODE FOR CARRYING OUT THE INVENTION

Below, the invention will specifically be described.

The invention is a technique applicable to the two liquid mixed self-hardening type of printing a resin having a hardening agent mixed, among the three dimensional laminate molding (RP molding) methods.

More specifically, in the invention, a molding sand for three dimensional laminate molding having a hardening agent as a catalyst for hardening a resin kneaded is used, and the requirements essential as the physical properties thereof are the following two: linear thermal expansion amount and powder flowability.

[The linear thermal expansion amount when a mold is heated from a room temperature to 1000° C. is not more than 0.9%]

The mold (sand mold) according to the invention sets the linear thermal expansion amount when heated from a room temperature to 1000° C. to be not more than 0.9%. It is because with more than 0.9%, when molding is performed in the subject mold, a micro crack and the like occur in the mold, which become starting points of a veining defect.

In addition, the lower limit of the linear thermal expansion amount is not particularly limited, may be 0%, but is industrially about 0.8%.

[The ratio (D/d) between the diameter of a slump (D) and the diameter of a slump cone (d) is not less than 1.65]

The powder flowability of a molding sand of the invention can be represented by the ratio (D/d) between the diameter of a slump (D) and the diameter of a slump cone (d) in a slump test.

Figure 4:
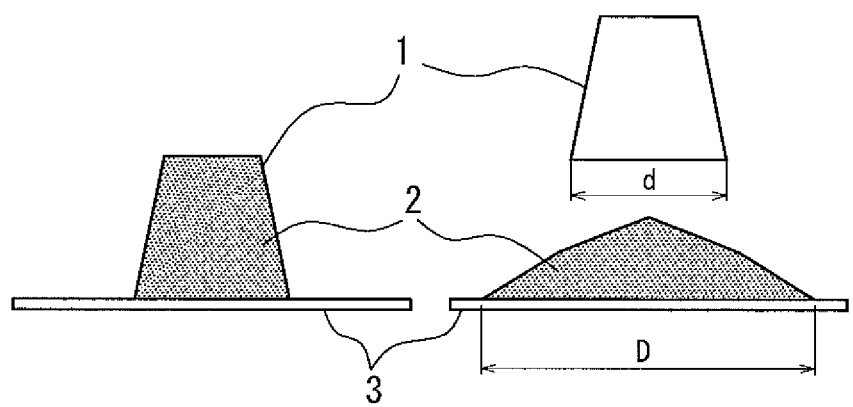
FIG. 4 is a view showing the measurement point (slump test) of the flowability of a molding sand.

More specifically, in the invention, the diameter of a slump (D) is obtained in a test for measuring the flowability of a molding sand referred to as slump test, as shown in FIG. 4. The diameter of a slump (D) refers to a spread of a sand 2 when the sand 2 is filled in a cup referred to as slump cone 1 and the slump cone is lifted up from a surface plate 3.

For example, in the invention, a slump cone with the diameter of the opening of 70 mm, the diameter of the bottom of 50 mm, and the height of 80 mm is used. Here, as shown in the above FIG. 4, the diameter of the opening: 70 mm is the diameter of the slump cone: d.

The flowability of a molding sand can be evaluated by measuring the slump flow when a slump cone is vertically lifted up, i.e. the diameter of a spread of a molding sand (D), and using the diameter of the slump thereof (D) to obtain the ratio (D/d) with the diameter of the slump cone.

Figure 1:
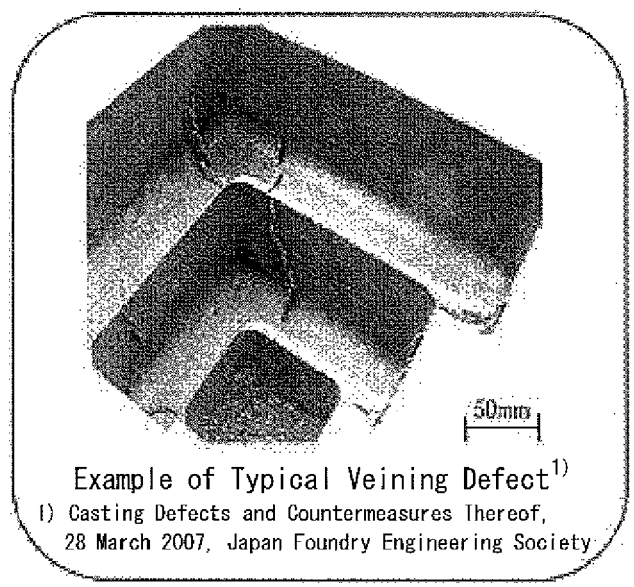
FIG. 1 is a view showing a burr-like defect referred to as a veining defect.
Figure 2:
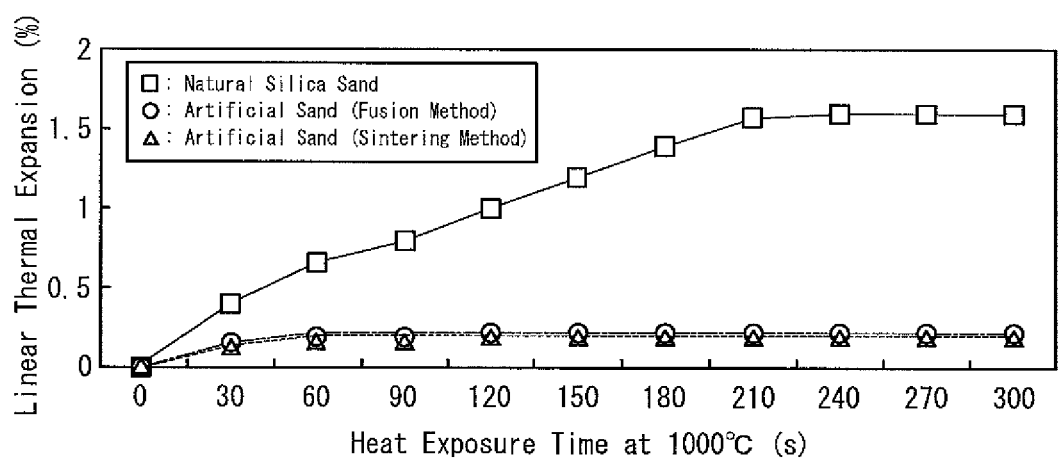
Figure 3:
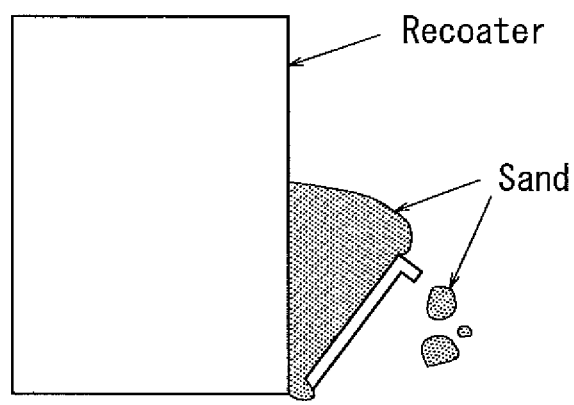
FIG. 3 is a view showing a recoater for laminating a sand for three dimensional laminate molding.

Here, in the invention, the above ratio (D/d) is required to be not less than 1.65. It is because, with less than 1.65, the flowability of a molding sand becomes extremely poor, and in a recoater for laminating a sand with the purpose of forming a complicated shape, as shown in FIG. 3, a molding sand does not flow.

In addition, the upper limit of the above ratio (D/d) is not particularly limited, but the industrially producible is about 2.0.

[Hardening Agent]

As a hardening agent with a function as a catalyst for hardening a resin used in the invention, any of conventionally known hardening agents, i.e. ones for hardening an organic resin such as a furan resin and the like at a room (or ambient) temperature can be preferably used. For example, ones containing xylene sulfonic acid or toluene sulfonic acid as a main component are excellent in handling and are preferable.

Also, the kneading ratio of the hardening agent is, based on the total mass of the molding sand, preferably within a range of 0.1 to 1.0% by mass. It is because, by kneading the hardening agent within this range, the moldability and the flowability of the molding sand are balanced the best.

In the invention, although a raw material of the molding sand is not particularly limited as long as it is typically used as the molding sand, and the values of the linear thermal expansion amount and the above ratio (D/d) are satisfied as described above respectively, for example, with respect to a natural silica sand, it is preferable to knead the following second component and the above hardening agent.

[Second Component]

The above second component is preferably a natural or artificial sand with a linear thermal expansion amount smaller than the natural silica sand, and the kneading ratio thereof is, based on the mass of the molding sand, preferably within a range of 40 to 95% by mass. It is because, by kneading the natural or artificial sand with the above linear thermal expansion amount in the above kneading ratio, the linear thermal expansion amount when a mold produced using the molding sand is heated from a room temperature to 1000° C. is easily adjusted to be not more than 0.9%.

In addition, the natural sand includes a zircon sand. Also, the second component in the invention does not need to be a simple product such as an artificial sand comprising one oxide, and there is no problem as long as the values of the above linear thermal expansion amount and the above ratio (D/d) are satisfied respectively, even with a mixture of a natural or artificial sand, or even mixing a plurality of the following artificial sand, for example.

[Artificial Sand]

In the invention, as the second component described above, an artificial sand produced by a sintering method, a fusion method or a flame fusion method, and at least one kind selected from a new sand, a reclaimed sand thereof and a reborn sand thereof can be used. In particular, an artificial sand produced by a sintering method, which has the average particle size of 0.5 to 2 times the average particle size of the natural silica sand, specifically of about 80 to 200 µm, is preferable in terms of handling.

Moreover, as composition thereof, mixed systems such as alumina (Al—O system), mullite (Al—Si—O system), mullite-zircon (Al—Si—Zr—O system) and the like are preferable.

Additionally, in the invention, the sphericity of the artificial sand is not particularly limited, and a known product is good. Also, in the invention, as the above average particle size, a value measured using a laser diffraction type particle size analyzer is used.

[Natural Silica Sand]

In the invention, as a natural silica sand, one with the average particle size: within a range of 80 to 250 µm is preferable.

In the invention, with respect to the above natural silica sand, it is preferable to knead the above second component and hardening agent, but the equipment used upon kneading may be a conventionally known device. For example, various kneading devices for kneading cement, mortar and the like can be used. Also, the kneading conditions may follow the normal method upon using the subject kneading device.

Above, various conditions of the invention have been described, and below, main parameters will be summarized.
Artificial Sand Average particle size: 0.5 to 2 times the average particle size of the natural silica sand is preferable, and 0.7 to 1.5 times is more preferable. Further, 80 to 250 µm is preferable, and 100 to 200 µm is more preferable.
Natural Silica Sand Basic composition: The main component (contained in not less than 70% by mass) is $SiO_2$, and the remainder is inevitable impurities.

Average particle size: 80 to 250 µm is preferable, and 100 to 200 µm is more preferable.

Kneading ratio of the artificial sand: Based on the mass of the molding sand, 40 to 95% by mass is preferable, and 50 to 95% by mass is more preferable.

Linear thermal expansion amount of the second component: The linear thermal expansion amount is preferable to be smaller than the natural silica sand by about 0.5 to 1.5%.

Kneading ratio of hardening agent: Based on the mass of the molding sand, 0.1 to 1.0% by mass is preferable, and 0.1 to 0.7% by mass is more preferable.

Linear thermal expansion amount when a mold is heated from a room temperature to 1000° C.: Not more than 0.9% is essential, and not more than 0.8% is preferable.

Ratio (D/d) between the diameter of a slump (D) and the diameter of a slump cone (d): Not less than 1.65 is essential, and not less than 1.8 is preferable.

[RP Molding Method and Molding]

The invention uses the three dimensional laminate molding (RP molding) method, and when a sand mold for the upper mold is produced, the sand mold for the upper mold can be directly formed by laminating a material one layer by one layer, without using mechanical processing based on data obtained by 3DCAD designing the shape of the upper mold. Preferably, a print molding method is used. More specifically, an RP sand mold molding device (e.g. Prometal RCT S-print (trademark), distributer: Ex One KK) is used, firstly, to evenly spread a thin layer of a molding sand on a flat surface by a blade mechanism having a recoater as described in FIG. 3. Then, to a desirable region in this thin layer, an inkjet nozzle head is scanned based on the above 3DCAD data to print a binder as an organic resin. In this regard, the thickness of one layer is preferably within a range of 200 to 500 µm. It is more preferably within a range of 200 to 300 µm. It is because, by setting the print thickness to be such a thickness, a sand mold with a more complicated shape can be formed.

A layer as a region where a binder is printed is in a connection state, and also binds to the lower layer which has already been formed. Then, until the entire sand mold for the upper mold is completed, a step of forming a thin layer on the top sequentially and printing a binder is repeated.

Finally, a molding sand where a binder did not attach is in a non-connection state and can be removed easily when the sand mold for the upper mold is removed from the device, so the sand mold for the upper mold becomes separable. By going through the above steps, a sand mold for the upper mold with a desirable three dimensional structure can be produced.

Moreover, as the above binder (organic resin), it is preferable to use a furan resin. The furan resin includes a furan resin comprising one kind or more selected from the group consisting of furfuryl alcohol, a condensate of furfuryl alcohol and aldehydes, a condensate of phenols and aldehydes, and a condensate of urea and aldehydes, or two kinds or more of condensates selected from the above group, for example.

In the invention, by going through each of the above steps under each preferable condition, for example a large cylinder head of cast iron and the like, which are difficult to mold at a high melting point, can be produced.

EXAMPLES

Examples will be described below.

A natural silica sand, an artificial sand and a hardening agent were kneaded using a kneading mixer to produce a molding sand, a thin layer of the molding sand was evenly spread on a flat surface using a blade mechanism having a recoater shown in FIG. 3, and to a desirable region of this thin layer, an inkjet nozzle head was scanned based on a predetermined 3DCAD data to print a binder as an organic resin. Additionally, in this regard, the thickness of one layer was 200 to 400 μm.

Here, the natural silica sand, the artificial sand, the hardening agent and the organic resin used in the above example are as follows.

Artificial sand: Mixed composition sand of mullite and silica produced by a fusion method, average particle size: 130 μm, sphericity: 0.98.

Moreover, the above sphericity is a value obtained by the formula [peripheral length of a perfect circle with the same area as the projected area of particle (mm)]/[peripheral length of the projected area of particle (mm)]. Also, two spherical lengths in the formula can be obtained by taking an enlarged (close-up) photograph of the subject particle, and then applying the photograph to an image analyzer. In addition, a calculation was performed for about 10 optional particles and the average value was the sphericity of the subject particle.

Natural silica sand: Average particle size: 140 μm

Hardening agent: Containing toluene sulphonic acid as the main component, and about 5% by mass of sulfuric acid The kneading ratio of the artificial sand was, based on the mass of the molding sand, 60% by mass The kneading ratio of the hardening agent was, based on the mass of the molding sand, 0.3% by mass The physical properties of the mold and molding sand produced of the above materials are as follows.

Linear thermal expansion amount when a mold is heated from a room temperature to 1000° C.: 0.8%

Ratio (D/d) between the diameter of a slump (D) and the diameter of a slump cone (d): 1.8

Additionally, in the example, a slump cone with the diameter of the opening (d) of 85 mm, the diameter of the bottom of 58 mm, and the height of 140 mm was used.

Molding was performed by the RP molding method under the following conditions using the above molding sand.

Thickness of one layer: 300 μm
Organic resin: Furfuryl alcohol
Molding
Material of mold (standard): FCD500
Shape: Cylinder head for diesel engine As a result, the above inventive example could form a sand mold (mold) not requiring additional heat treatment, and moreover, in the molding step using the sand mold, a molded product having no veining defect occurring, and having a predetermined shape could be produced.

In contrast, as Comparative Examples, one having a natural silica sand and a hardening agent kneaded (Comparative Example 1), and one having an artificial sand and a hardening agent kneaded (Comparative Example 2) were produced, a mold was produced by the RP molding method under the same condition, and molding in the same shape was performed with cast iron of the same material.

In addition, as the above natural silica sand, artificial sand and hardening agent, the ones with the same physical properties as the above inventive example were used.

As a result,
Comparative Example 1 had
the linear thermal expansion amount when a mold is heated from a room temperature to 1000° C.: 1.5%
the ratio (D/d) between the diameter of a slump (D) and the diameter of a slump cone (d): 2.0, and also Comparative Example 2 obtained each physical property of the linear thermal expansion amount when a mold is heated from a room temperature to 1000° C.: 0.2%
the ratio (D/d) between the diameter of a slump (D) and the diameter of a slump cone (d): 1.5.

Then, molding was performed using a sand mold produced using the above molding sand. As a result, while in Comparative Example 1, a number of veining defects occurred on all sites of a product surface, in Comparative Example 2, a thin layer of the molding sand could not be formed, or a desirable mold could not be produced. In addition, the linear thermal expansion amount of a mold of Comparative Example 2 was described by measuring the linear thermal expansion amount of one formed by kneading the same amount of resin and hardening agent as the inventive example with a mortar mixer.

INDUSTRIAL APPLICABILITY

According to the invention, a sand mold formed by the RP molding method not requiring heat treatment can be applied to production of engine cylinder heads, water boxes for engine, cylinder blocks for engine, impeller for large pump, and the like, as molded products having a complicated hollow structure and a high melting point.

EXPLANATION OF REFERENCES

1 Slump cone
2 Sand
3 Surface plate

What is claimed is:
1. A molding sand for a two-liquid mixed organic self-hardening type three dimensional laminate molding, consisting of:
a natural silica sand;
a second component; and
a hardening agent as a catalyst,
wherein the second component and the hardening agent are kneaded to the natural silica sand,
wherein the second component is a natural or artificial sand that is kneaded at an amount of 40 to 95% by mass of the molding sand,
wherein a linear thermal expansion value when a mold produced using the molding sand is heated from a room temperature to 1000° C. is not more than 0.9%,
wherein a ratio (D/d) between a diameter of a slump (D) and a diameter of a slump cone (d) in a slump test of the molding sand is not less than 1.65, and
wherein an average particle size of the artificial sand is 0.5 to 2 times an average particle size of the natural silica sand.

2. The molding sand according to claim 1, wherein the second component is the natural or artificial sand with the linear thermal expansion value smaller than the natural silica sand.

3. The molding sand according to claim 1, wherein the second component is the artificial sand produced by any of a sintering method, a fusion method or a flame fusion method, and is at least one kind selected from a new sand, a reclaimed sand thereof and a reborn sand thereof.

4. The molding sand according to claim 1, wherein the hardening agent is kneaded at an amount of 0.1 to 1.0% by mass of the molding sand.

5. The molding sand according to claim 3, wherein the hardening agent is kneaded at an amount of 0.1 to 1.0% by mass of the molding sand.

\* \* \* \* \*